(12) United States Patent
Zakowski (10) Patent No.: US 10,154,759 B2
(45) Date of Patent: Dec. 18, 2018

(54) LID SECURING MECHANISM FOR FOOD PROCESSOR

(71) Applicant: Joseph W. Zakowski, New Canann, CT (US)

(72) Inventor: Joseph W. Zakowski, New Canann, CT (US)

(73) Assignee: Conair Corporation, Stamford, CT (US)

( * ) Notice: Subject to any disclaimer, the term of this patent is extended or adjusted under 35 U.S.C. 154(b) by 536 days.

(21) Appl. No.: 14/245,094

(22) Filed: Apr. 4, 2014

(65) Prior Publication Data

US 2014/0299691 A1    Oct. 9, 2014

Related U.S. Application Data

(60) Provisional application No. 61/809,487, filed on Apr. 8, 2013.

(51) Int. Cl.
*A47J 43/07*    (2006.01)
*A47J 43/044*    (2006.01)
*A47J 43/046*    (2006.01)

(52) U.S. Cl.
CPC ......... *A47J 43/0716* (2013.01); *A47J 43/044* (2013.01); *A47J 43/046* (2013.01); *A47J 43/0705* (2013.01)

(58) Field of Classification Search
CPC .. A47J 43/0716; A47J 43/044; A47J 43/0705; A47J 43/0755; A47J 43/0727; A47J 43/046

USPC ........... 241/92, 282.1, 282.2; 220/784, 254.1
See application file for complete search history.

(56) References Cited

U.S. PATENT DOCUMENTS

| | | | | |
|---|---|---|---|---|
| 4,058,214 A * | 11/1977 | Mancuso | ................ | A47J 47/02 206/545 |
| 6,076,452 A * | 6/2000 | Dessuise | ................ | A47J 27/04 126/20 |
| 6,283,625 B2 * | 9/2001 | Frankel | ............... | A47J 43/0716 366/146 |
| 7,069,839 B2 * | 7/2006 | Kernan | ............... | A47J 43/0777 241/37.5 |
| 7,721,908 B2 * | 5/2010 | Cronin | ................... | B65D 43/12 220/345.1 |
| 8,074,830 B2 * | 12/2011 | Pomfrey | .................. | B65D 1/34 220/788 |
| 8,322,553 B2 * | 12/2012 | Rider, Jr. | ............. | B65D 43/021 220/203.09 |
| 8,911,807 B2 * | 12/2014 | Hinze | ................ | B65D 77/2072 220/784 |
| 2004/0000565 A1 * | 1/2004 | Nicholas | ............ | A47G 19/2205 222/142.9 |
| 2005/0233036 A1 * | 10/2005 | Feldmeier | ............ | B65D 43/021 426/121 |

(Continued)

*Primary Examiner* — Faye Francis
(74) *Attorney, Agent, or Firm* — Grogan, Tuccillo & Vanderleeden, LLP (57) ABSTRACT

A food processor having a work bowl and lid configured to be selectively removable from the bowl is provided. The food processor includes a mechanism for securing the lid to the work bowl. The mechanism includes a plurality of recesses formed in an interior lip of the bowl and a plurality of corresponding protrusions formed on an exterior lip of the lid. The protrusions are configured to engage the recesses to align and secure the lid to the bowl.

10 Claims, 9 Drawing Sheets

(56) References Cited

U.S. PATENT DOCUMENTS

| | | | |
|---|---|---|---|
| 2008/0089170 A1* | 4/2008 | Larsen | A47J 43/046 366/192 |
| 2008/0118609 A1* | 5/2008 | Harlfinger | B65D 43/0206 426/106 |
| 2010/0200075 A1* | 8/2010 | Thurlow | A47J 36/04 137/14 |
| 2011/0031246 A1* | 2/2011 | Massey, Jr. | B65D 43/0249 220/214 |
| 2011/0079596 A1* | 4/2011 | Krasznai | A47J 36/06 220/287 |
| 2011/0111099 A1* | 5/2011 | Hinze | B65D 77/2072 426/123 |
| 2012/0167781 A1* | 7/2012 | Lane | A47J 27/56 99/453 |
| 2012/0294108 A1* | 11/2012 | Dickson, Jr. | A47J 43/046 366/205 |
| 2013/0233181 A1* | 9/2013 | Allen | A47J 27/04 99/337 |
| 2013/0308417 A1* | 11/2013 | Ulanski | B01F 15/00831 366/279 |
| 2015/0258514 A1* | 9/2015 | Boozer | A47J 43/0727 366/142 |
| 2015/0313414 A1* | 11/2015 | Gerard | A47J 36/06 99/353 |

* cited by examiner

LID SECURING MECHANISM FOR FOOD PROCESSOR

CROSS-REFERENCE TO RELATED APPLICATIONS

This application claims the benefit of U.S. Provisional Application Ser. No. 61/809,487, filed on Apr. 8, 2013, which is herein incorporated by reference in its entirety.

FIELD OF THE INVENTION

The present invention relates to food processors and, more particularly, to a lid securing mechanism for a food processor.

BACKGROUND OF THE INVENTION

Food processing devices providing a number of different types of food preparations, such as mixing, grinding, chopping, slicing, grating, shredding, or other processing operations, are well known. Existing food processing devices typically include a base housing an electric motor, a drive shaft driven by the motor, a bowl receivable on the base and a lid or cover having a feed tube releasably mounted to the bowl. A rotatably driven blade is mounted to the drive shaft to process one or more food items inside the bowl.

While existing food processing devices are generally suitable for what is regarded as ordinary performance, there is room for improvement in terms of safety and ease of use.

SUMMARY OF THE INVENTION

It is an object of the present invention to provide a food processor having a lid securing mechanism.

It is another object of the present invention to provide a food processor having a lid securing mechanism that ensures proper alignment and securement of a lid with a work bowl.

These and other objects are achieved by the present invention.

According to an embodiment of the present invention, a food processor having a work bowl and lid configured to be selectively removable from the bowl is provided. The food processor includes a mechanism for securing the lid to the work bowl. The mechanism includes a plurality of recesses formed in an interior lip of the bowl and a plurality of corresponding protrusions formed on an exterior lip of the lid. The protrusions are configured to engage the recesses to align and secure the lid to the bowl.

BRIEF DESCRIPTION OF THE DRAWINGS

The present invention will be better understood from reading the following description of non-limiting embodiments, with reference to the attached drawings, wherein below.

DETAILED DESCRIPTION OF THE PREFERRED EMBODIMENTS

Figure 1:
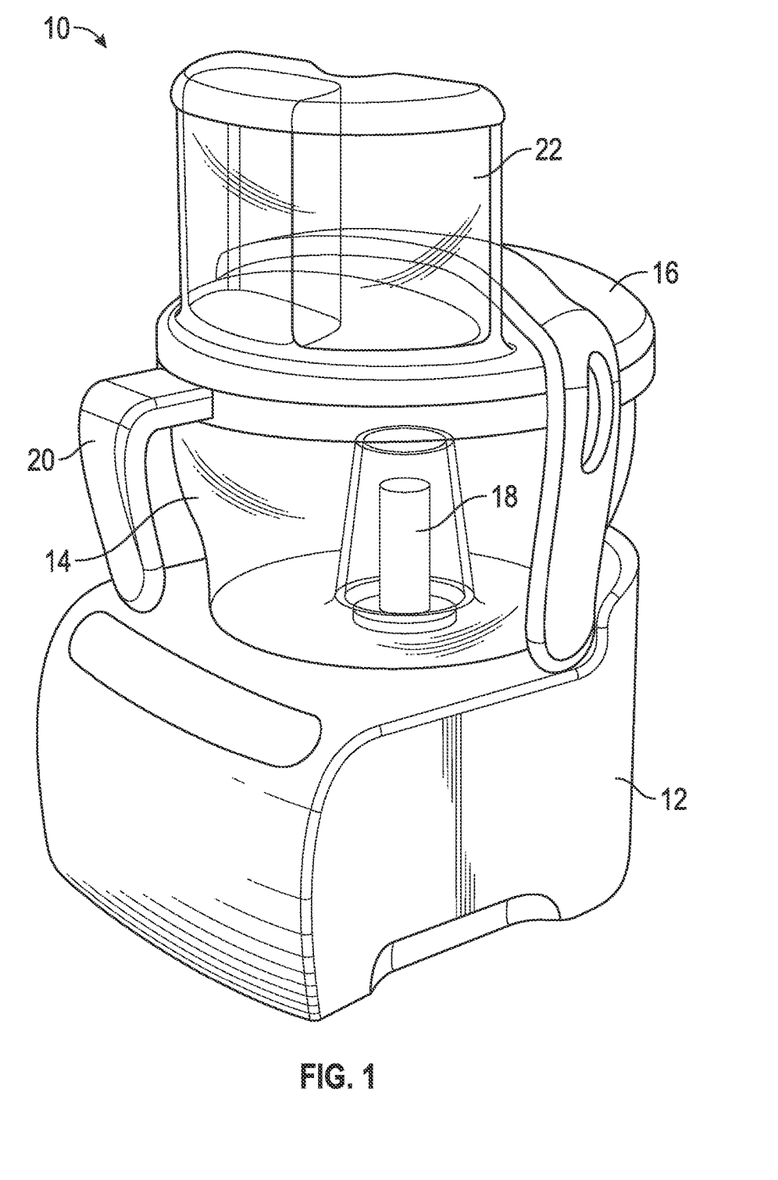
FIG. 1 is a perspective view of a food processor according to an embodiment of the present invention.

Referring to FIG. 1, a food processor 10 according to the present invention is shown. The food processor 10 includes a base 12, a work bowl or receptacle 14 received on the base 12, and a lid 16 configured to be selectively removable from the work bowl 14. Base 12 includes a motor or other rotary drive mechanism (not shown) connected to a rotatable output shaft 18 for rotatably driving a blade interior to the work bowl 14 and may include controls (not shown) for varying settings of the motor.

As further shown therein, work bowl 14 is generally cylindrical or frusto-conical in shape and has a handle 20 and a pour spout (not shown). The lid 16 defines a substantially circular body sized and is dimensioned to cover work bowl 14. The lid 16 also includes a feed tube opening (not shown). The feed tube opening may be generally oval in shape, although other shapes and dimensions are envisioned without departing from the broader aspects of the present invention.

As best shown in FIG. 1, the lid 16 may also include a feed tube 22 defining a substantially annular body having a substantially oval cross-section extending upwards from the lid 16 and in communication with the feed tube opening. As is well known in the art, the feed tube 22 provides a chute through which a user may load food items to be processed into the work bowl 14.

Figure 2:
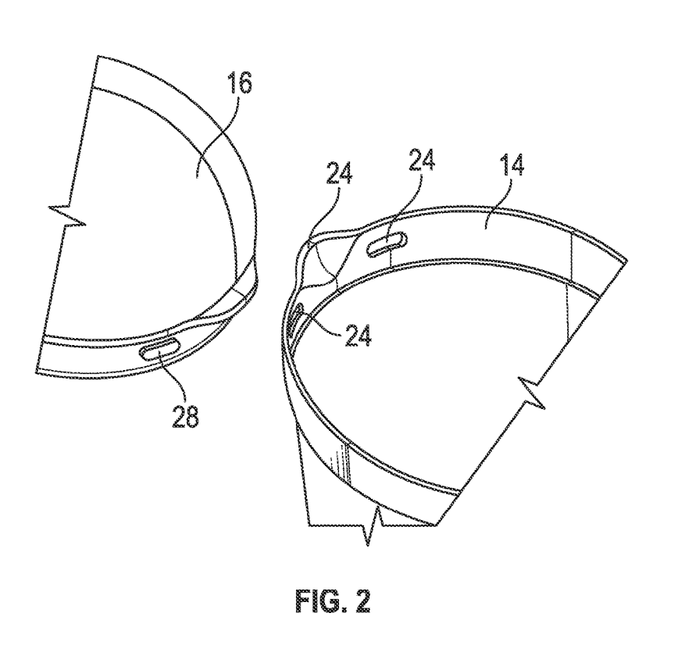
FIG. 2 is an enlarged, perspective view of a lid of the food processor of FIG. 1 having a securing mechanism, according to an embodiment of the present invention.
Figure 3:
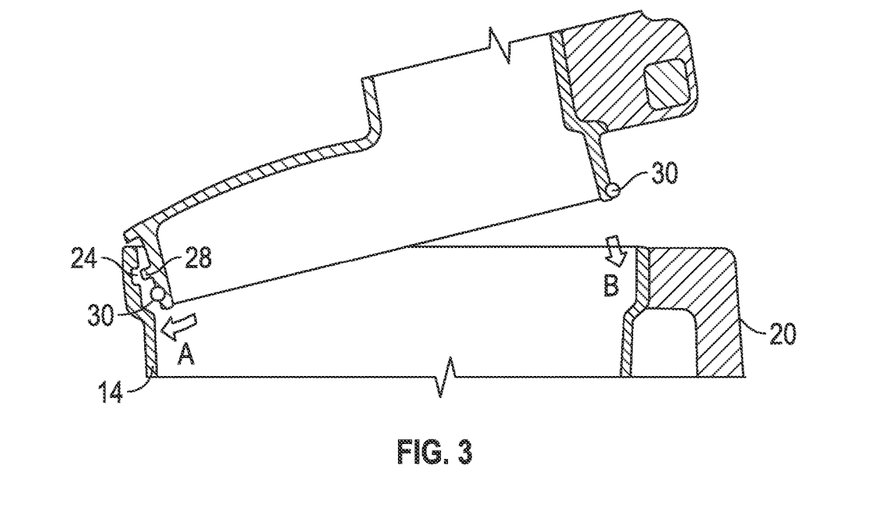
FIG. 3 is an enlarged, cross-sectional view of the food processor of FIG. 1, illustrating the lid securing mechanism.
Figure 4:
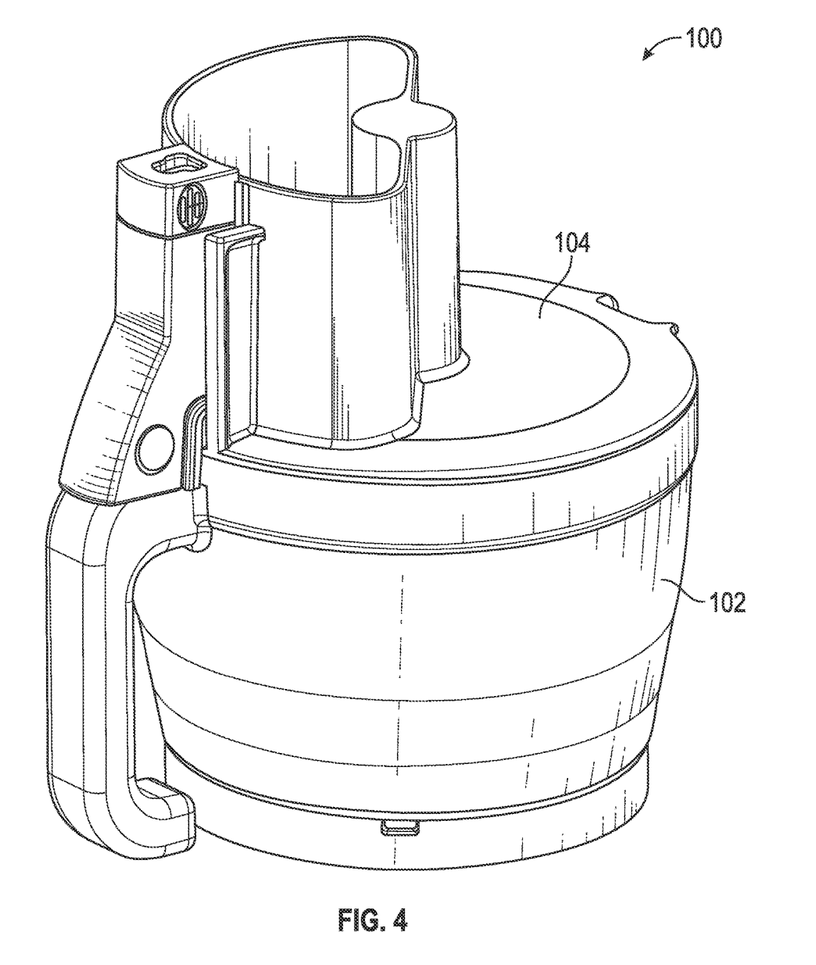
FIG. 4 is a perspective view of a food processor bowl and lid according to another embodiment of the present invention.
Figure 5:
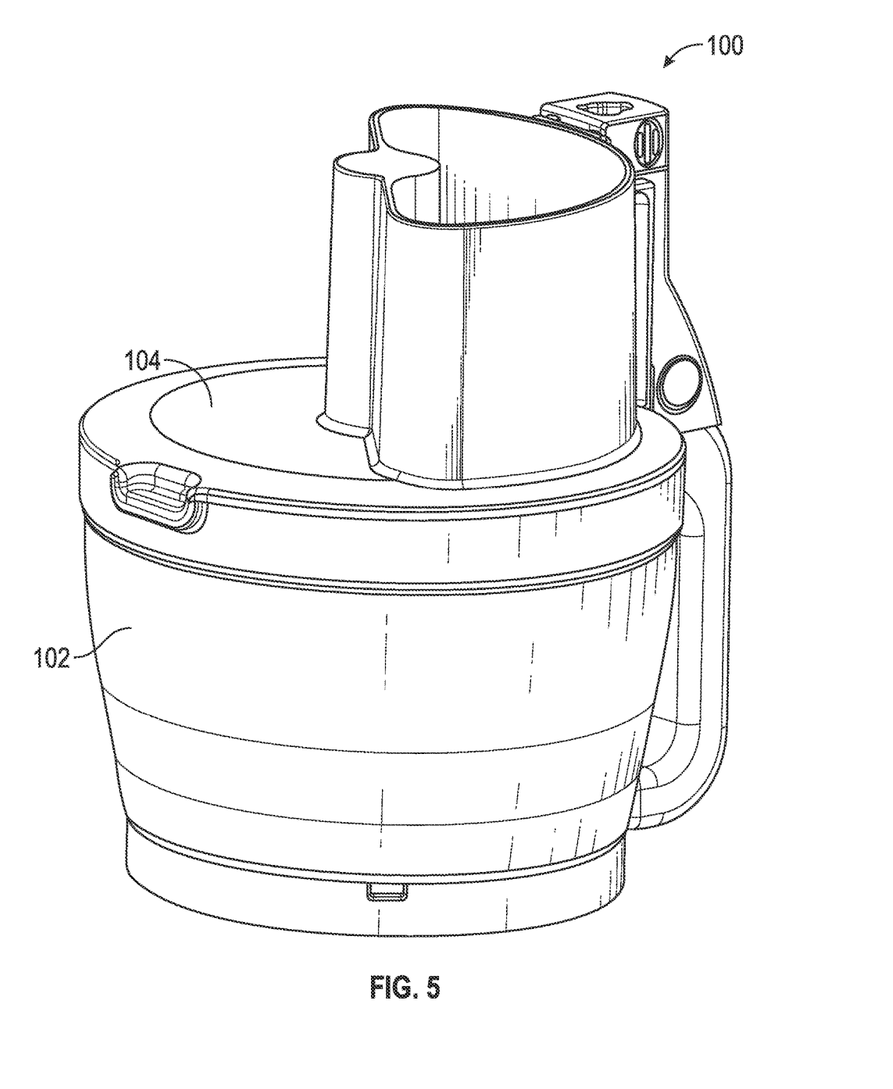
FIG. 5 is another perspective view of the food processor bowl and lid of FIG. 4.
Figure 6:
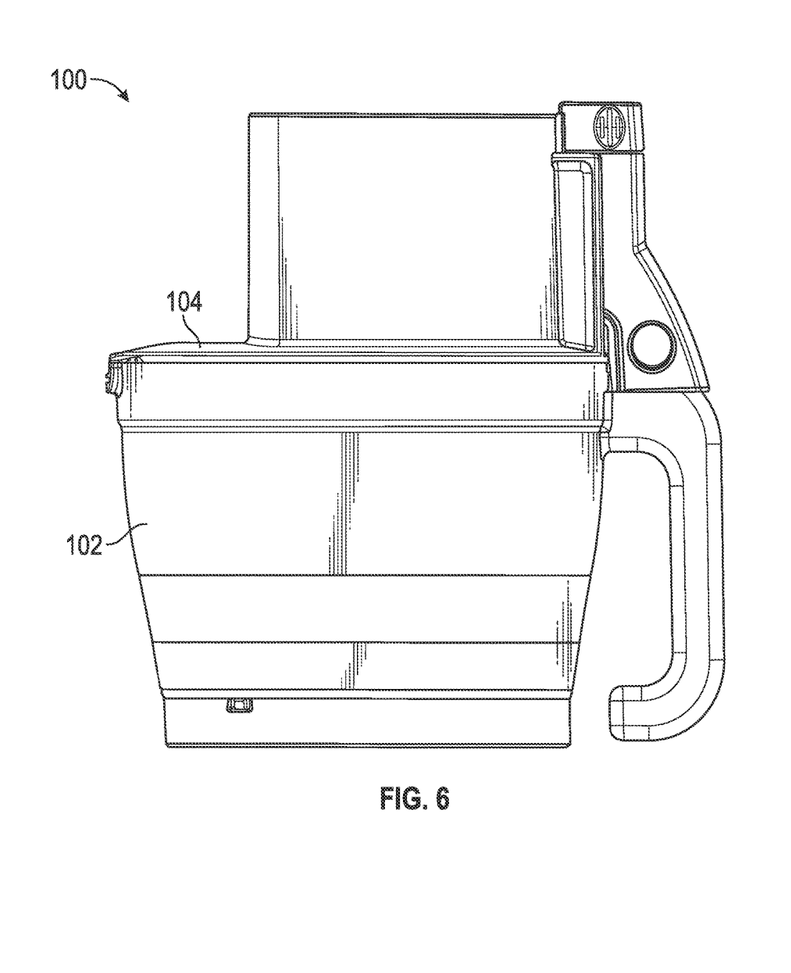
FIG. 6 is a side, elevational view of the food processor bowl and lid of FIG. 4.

Referring now to FIGS. 2 and 3, the food processor 10 includes a mechanism for securing the lid 16 to the work bowl 12. In particular, as shown therein, an interior lip of the bowl 12 is formed with a pair of indents or recesses 24 positioned on opposing sides of a pour spout 26. An exterior lip of the lid 16 includes a pair of protrusions 28 sized and shaped to engage the recesses 24 in the lid 16, as discussed in detail below.

In operation, when placing the lid 16 on a bowl 14, a user angles the front of the lid 16 towards the front of the bowl 14, as shown in FIG. 3, and slides the lid 16 forward in the direction of arrow A, such that the protrusions 28 on the lid 16 engage with the recesses 24 on the interior of the bowl 14. A user then pushes the rear of the lid 16 downwards, in the direction of arrow B, until the lid 16 is properly seated and latched on the bowl 14. In this position, a resilient seal 30 on the outer periphery of the lid 16 comes into pressing contact with an interior of the bowl 14, forming a liquid-tight seal therebetween.

Importantly, the lid securing mechanism of the present invention ensures that the lid 16 cannot be closed on the bowl 14 unless the protrusions 28 and recesses 24 are engaged with one another. As will be readily appreciated, this ensures that a user aligns and secures the lid 16 correctly.

As shown in FIGS. 2 and 3, the recesses 24 and protrusions 28 are substantially oval in shape, although other shapes are certainly possible without departing from the broader aspects of the present invention. In addition, while FIGS. 2 and 3 illustrate a food processor with a pair of respective protrusions and recesses, more or fewer protrusions and recesses are also contemplated.

Turning now to FIGS. 4-10, a food processor bowl and lid combination 100 according to another embodiment of the present invention is shown. As best shown therein, the food processor is substantially similar to existing food processors known in the art and includes a bowl 102 and a lid 104 configured to be selectively removable from the bowl 102.

Figure 7:
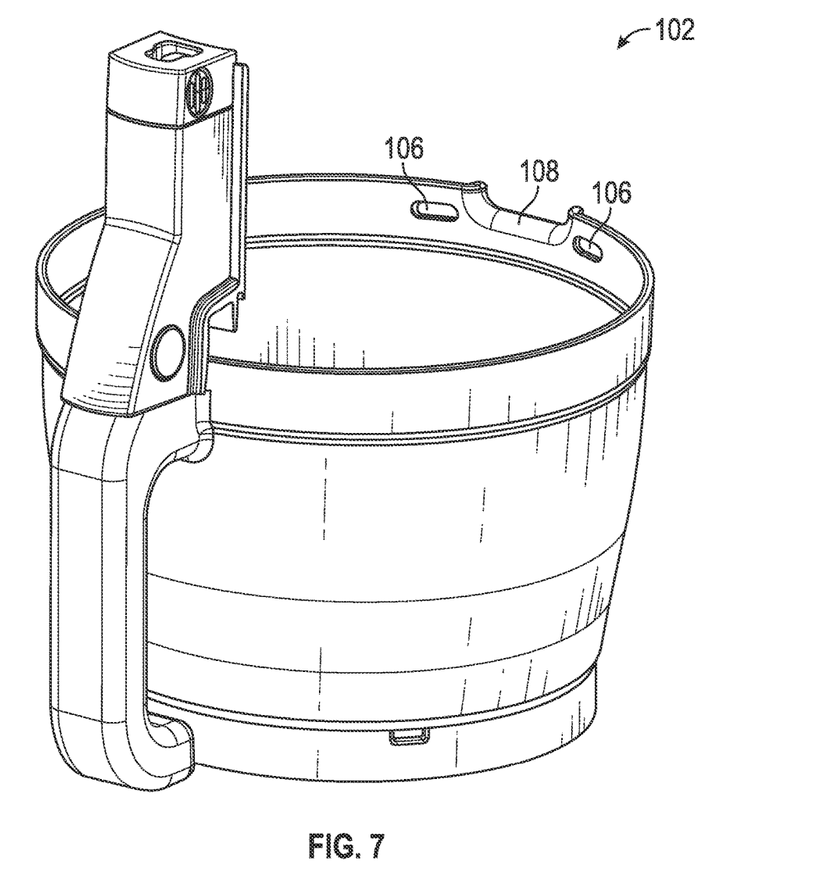
FIG. 7 is a perspective view of the food processor bowl of FIG. 4 with the lid removed.
Figure 8:
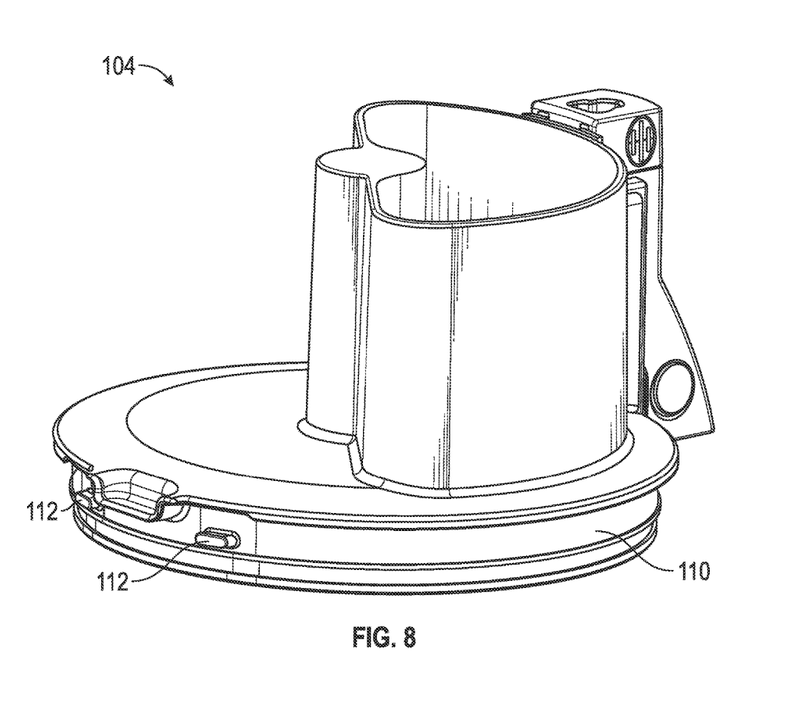
FIG. 8 is a perspective view of the food processor lid of FIG. 4.
Figure 9:
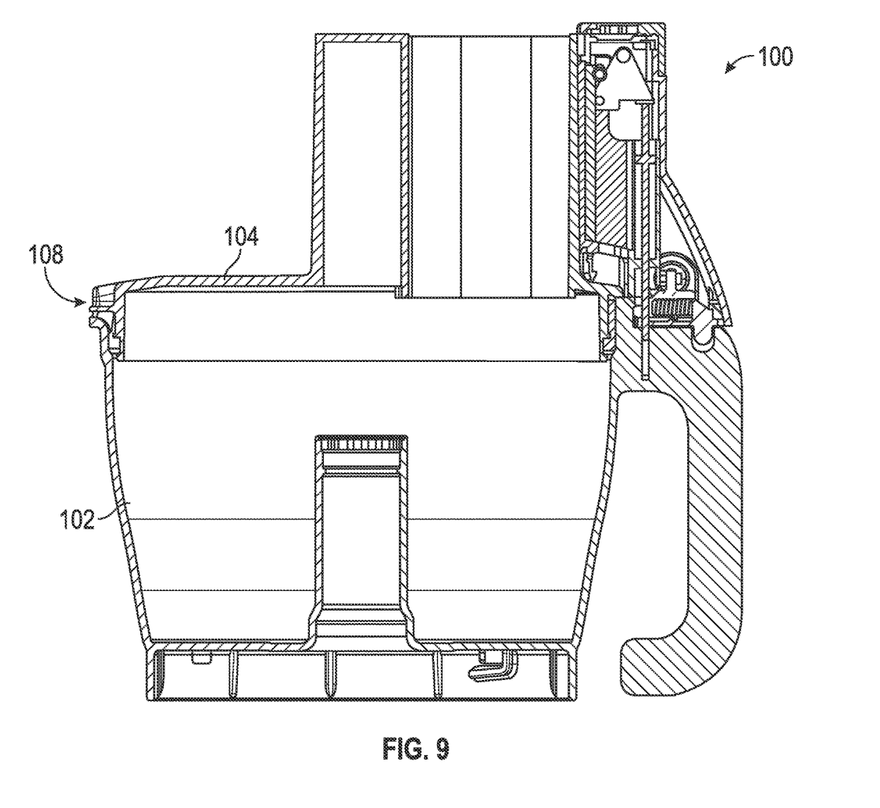
FIG. 9 is a cross-sectional view of the food processor bowl and lid of FIG. 4.
Figure 10:
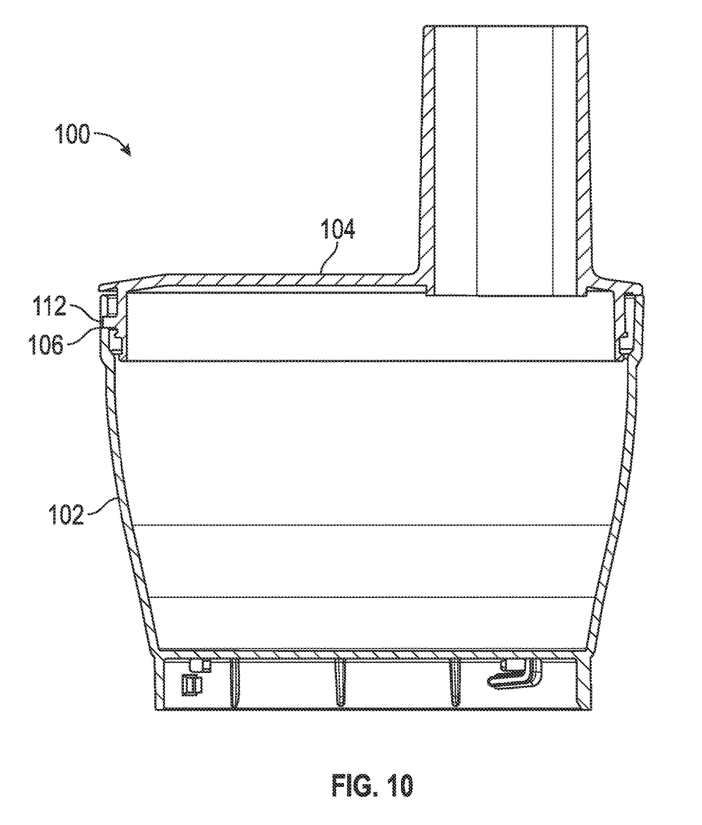
FIG. 10 is another cross-sectional view of the food processor bowl and lid of FIG. 4.

Referring now to FIG. 7, the bowl 102 of the food processor 100 is shown with the lid 104 removed. As shown therein, an interior lip of the bowl 102 is formed with a pair of indents or recesses 106 positioned on opposing sides of a pour spout 108, similar to the embodiment described above. With reference to FIG. 8, an exterior lip 110 of the lid 104 includes a pair of protrusions 112 sized and shaped to engage the recesses 106 in the lid 104, in a manner similar to that described above.

As discussed above in connection with the preferred embodiment, in operation, when placing the lid 104 on a bowl 102, a user angles the front of the lid 104 towards the front of the bowl 102 and slides the lid 104 forward until the protrusions 112 on the lid 104 engage with the recesses 106 on the interior of the bowl 102. A user then pushes the rear of the lid 104 downwards until the lid 104 is properly seated and latched on the bowl 102.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed is:

1. A food processor, comprising:
a base;
a motor disposed within said base;
an output shaft operatively connected to said motor and extending outwardly from said base, said output shaft being rotatable upon actuation of said motor;
a work bowl received on said base, said work bowl having a pour spout at a forward portion of said work bowl and two recesses formed in an inner peripheral surface of said work bowl on opposing sides of said pour spout and adjacent to an upper lip of said work bowl; and
a lid configured to be received atop said work bowl, said lid including two protrusions on an outer peripheral surface of said lid and being configured to be received in said recesses in said work bowl, and a resilient seal extending around said outer peripheral surface of said lid;
wherein a rear portion of said work bowl opposite said pour spout is devoid of any recesses and a rear portion of said lid opposite said protrusions is devoid of any protrusions such that said lid can be secured to said work bowl and said resilient seal can fully engage said inner peripheral surface of said work bowl only by first inserting said protrusions of said lid into said recesses in said work bowl and then pushing down on said rear portion of said lid to fully seat said lid on said work bowl.

2. The food processor of claim 1, wherein:
said protrusions and recesses are substantially oval in shape.

3. The food processor of claim 1, wherein:
said lid is selectively attachable to and detachable from said work bowl.

4. The food processor of claim 1, wherein:
said lid includes a feed tube a feed tube extending from said lid and adapted to receive a food product therethrough for guiding said food product into said work bowl.

5. The food processor of claim 1, wherein:
said work bowl is removably received on said base.

6. The food processor of claim 1, wherein:
said work bowl includes a handle opposite said pour spout.

7. The food processor of claim 1, wherein:
said lid includes a circumferential lip depending from said lid, said two protrusions being formed on said circumferential lip;
wherein said circumferential lip is dimensioned so as to be received by an interior wall of said work bowl;
wherein said circumferential lip forms at least a portion of said outer peripheral surface of said lid.

8. The food processor of claim 7, wherein:
said resilient seal extends about an outer periphery of said circumferential lip.

9. The food processor of claim 1, wherein:
wherein when said lid is received atop said work bowl, an outer peripheral surface of said lid is received by said inner peripheral surface of said work bowl.

10. A food processor, comprising:
a base;
a motor disposed within said base;
an output shaft operatively connected to said motor and extending outwardly from said base, said output shaft being rotatable upon actuation of said motor;
a work bowl received on said base, said work bowl including:
a generally circular top opening;
a handle at a rear portion of said work bowl;
a pour spout at a forward portion of said work bowl opposite said handle;
at least two recesses formed in an inner peripheral surface of said work bowl adjacent to an upper lip of said work bowl and arranged on opposing sides of said pour spout in close association with said pour spout; and
a generally circular lid configured to be received atop said work bowl, said lid including at least two protrusions in a forward portion of said lid configured to engage said at least two recesses in said forward portion of said work bowl, and a resilient seal extending around an outer peripheral surface of said lid;
wherein said rear portion of said work bowl opposite said pour spout is devoid of any recesses and a rear portion of said lid opposite said protrusions is devoid of any protrusions such that said lid can be secured to said work bowl and said resilient seal of said lid can fully engage said inner peripheral surface of said work bowl only by first inserting said protrusions of said lid into said recesses in said work bowl and then pushing down on said rear portion of said lid to fully seat said lid on said work bowl.

\* \* \* \* \*